UNITED STATES PATENT OFFICE.

GEORG MERLING AND OTTO CHRZESCINSKI, OF ELBERFELD, AND HUGO KÖHLER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

BETA-ACETYLALKYLENE-TETRAALKYLDIAMINS.

1,101,754.     Specification of Letters Patent.     Patented June 30, 1914.

No Drawing.     Application filed June 5, 1913. Serial No. 771,952.

*To all whom it may concern:*

Be it known that we, GEORG MERLING, OTTO CHRZESCINSKI, and HUGO KÖHLER, doctors of philosophy, chemists, citizens of the German Empire, residing at Elberfeld, Elberfeld, and Leverkusen, near Cologne-on-the-Rhine, Germany, have invented new and useful Improvements in Beta-Acetylalkylene-Tetra-alkyldiamins, of which the following is a specification.

The present invention concerns the production of the hitherto unknown keto compounds of the formula:

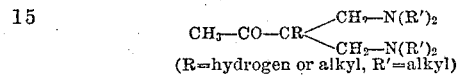
(R=hydrogen or alkyl, R'=alkyl)

which are chemically beta-acetylalkylene-tetraalkyldiamins, are obtained for instance by the two-fold introduction of the residue $CH_2$—$N(R')_2$ into the corresponding ketone. These ketodiamins can be separated from the ketomonoamins by fractional distillation. These products have proved to be valuable intermediate products for the manufacture of erythrene and its homologues.

In order to illustrate the new process more fully the following examples are given, the parts being by weight:

*Example 1—Production of beta-acetyltrimethylenetetraethyldiamin from tetraethyldiaminomethane and acetone.*—750 parts of aqueous formaldehyde (40 per cent.) are gradually dropped into 3,245 parts of equeous diethylamin solution (45 per cent.) which is being stirred and cooled and 2,000 parts of acetone, 400 parts of baryta water (saturated at ordinary temperature) and 500 parts of water are then added. After 20 days' heating from 25 to 30° C. bicarbonate is added to the brown solution in order to remove the baryta. Barium carbonate is removed by filtration. The oil is separated with potash from the filtrate and dried over potash. The excess of acetone is removed by distillation *in vacuo* and the remaining mixture of bases is decomposed by a fractional distillation *in vacuo* to beta-acetyltrimethylenetetraethyldiamin, (fractions from about 90–110° C. 7–8 mm). This base represents a colorless and odorless oil with a little yellow coloration boiling at 95–100° C. (7 to 8 mm).

*Example 2 — Production of beta-beta-acetylmethyltrimethylenetetraethyldiamin*

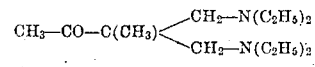

*from tetraethyldiaminomethane and methylethylketone.*—292 parts of an aqueous diethylamin solution (50 per cent.) are gradually dropped into 75 parts of aqueous formaldehyde (40 per cent.) while well stirred and cooled. This mixture forming two layers, is mixed with 210 parts of methylethylketone and boiled on the reflux condenser for so long a time until a test portion after acidulation with acetic acid is not any more rendered turbid by a solution of anilin acetate which requires several hours. The solution is then dehydrated with potash and worked up in the same manner as described in Example 1 whereby an analogous result is obtained. The new beta-beta-acetyl-methyltrimethylenetetraethyldiamin of the formula:

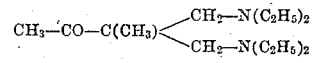

which is a colorless and odorless oil with a little yellow coloration boiling at 105–110° C. (7–8 mm.); being soluble in water.

We claim—

1. As new products the beta-acetylalkylenetetraalkyldiamins, which are colorless and odorless oils being soluble in water, substantially as described.

2. As new products the beta-acetylalkylenetetraethyldiamins, which are colorless and odorless oils being soluble in water, substantially as described.

3. As new products the beta-acetyltrimethylenetetraalkyldiamins, which are colorless and odorless oils being soluble in water, substantially as described.

4. As new product the beta-acetyltrimethylenetetraethyldiamin of the formula

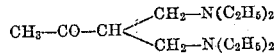

which is colorless and odorless oil with a little yellow coloration boiling at 95–100° C. (7–8 mm.); being soluble in water and being split up by heating it with dilute sulfuric acid into diethylamin and beta-acetylalkyldiethylamin, substantially as described.

In testimony whereof we have hereunto set our hands in the presence of two subscribing witnesses.

GEORG MERLING. [L. S.]
OTTO CHRZESCINSKI. [L. S.]
HUGO KÖHLER. [L. S.]

Witnesses:
　HELEN NUFER,
　ALBERT NUFER.